March 17, 1925.

A. BEHRENS

PARING KNIFE

Filed March 27, 1924

1,529,684

Inventor
A. Behrens

By Clarence A. O'Brien
Attorney

Patented Mar. 17, 1925.

1,529,684

UNITED STATES PATENT OFFICE.

ALBERT BEHRENS, OF GALVA, IOWA.

PARING KNIFE.

Application filed March 27, 1924. Serial No. 702,440.

*To all whom it may concern:*

Be it known that I, ALBERT BEHRENS, a citizen of the United States, residing at Galva, in the county of Ida and State of Iowa, have invented certain new and useful Improvements in a Paring Knife, of which the following is a specification.

This invention relates to new and useful improvements in paring knives which are principally adapted for use in connection with the peeling of fruit and vegetables and has for its principal object to prevent the unnecessary waste of the fruit or vegetable being pared.

A further object of the invention is to provide a paring knife of the above mentioned character, which is simple in construction, inexpensive, strong and durable and furthermore adapted for the purposes for which it is designated.

Other objects and advantages of this invention will become apparent during the course of the following description.

Figure 1:
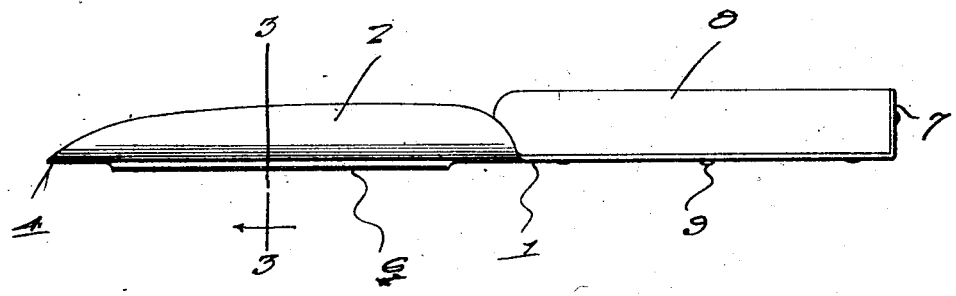
Figure 2:
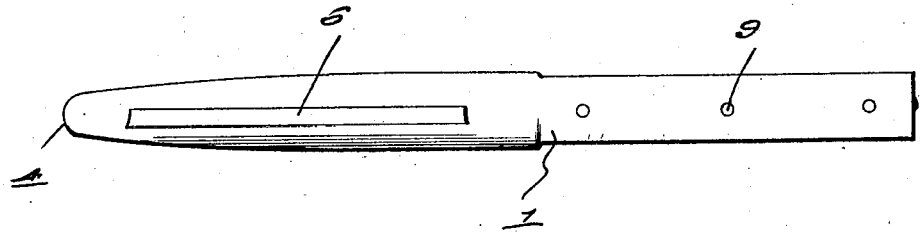
Figure 3:
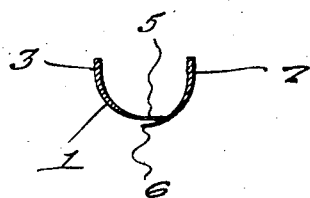

In the accompanying drawing forming a part of the specification and in which like numerals designate like parts throughout the same, Figure 1 is a side elevation of my improved paring knife, Figure 2 is a bottom plan view thereof, and Figure 3 is a transverse section taken approximately on line 3—3 of Figure 1.

In the drawing, wherein for the purpose of illustration is shown the preferred embodiment of my invention, the numeral 1 designates the shank of my improved paring knife and the same is formed of a substantially elongated strip of metal. The forward portion of the shank is provided with the lateral extensions 2 and 3 which are bent upwardly to provide a substantially U-shaped construction in the manner clearly illustrated in Figure 3 of the drawing. The lateral extensions 2 and 3 converge toward the forward end of the shank to provide a sharpened or pointed end 4 in the manner clearly illustrated in Figure 1 of the drawing.

Formed in the bottom of the forward end of the shank 1 and extending longitudinally for a greater portion of the substantially U-shaped construction is the slot 5. One of the side edges of the slot 5 is disposed outwardly as shown at 6 in the drawing to provide a sharp cutting edge in the manner well known in the art. The rear portion of the shank 1 is substantially flat and the rear end thereof is bent upwardly as shown at 7 in the drawing and adapted to be supported on the flat rear portion of the shank and against the end portion 7 is the wooden handle 8, any suitable fastening means such as is shown at 9 being provided for securing the handle in position on the shank and end portion thereof in the manner clearly illustrated in Figure 1 of the drawing.

By providing a paring knife of the above mentioned character, the same may be used for peeling or paring fruit or vegetables in such a manner as to prevent unnecessary waste which heretofore has resulted when the ordinary paring knives are used. Furthermore, the forward end of the knife may be used for removing spoiled portions of the fruit or the eyes of potatoes in the manner well known in the art.

The simplicity of my device enables the same to be manufactured at a very low cost and will be strong and durable.

While I have shown the preferred embodiment of my invention, it is to be understood that various changes in the size, shape and arrangement of parts may be resorted to without departing from the spirit of the invention and the scope of the appended claims.

Having thus described my invention, what I claim is:

1. A paring knife comprising a single metal stamping provided with a relatively narrow strip-like portion constituting means for attaching the stamping to one side of a handle, the free end of said narrow portion being directed laterally to bear against an adjacent end of said handle, that portion of the stamping extending beyond the other end of the narrow portion being comparatively wide and bent transversely into substantial channel-shape, said channel-shaped portion being provided with a longitudinal slot, one edge of which is directed laterally and sharpened to provide a cutting blade.

2. A paring knife comprising a single metal stamping provided with a relatively narrow strip-like portion constituting means for attaching the stamping to one side of a handle, the free end of said narrow portion being directed laterally to bear against an adjacent end of said handle, that portion of the stamping extending beyond the other end of the narrow portion being comparatively wide and being bent transversely into substantial channel shape, said channel shaped portion being provided with a longitudinally disposed cutting blade.

In testimony whereof I affix my signature.

ALBERT BEHRENS.